United States Patent [19]
Hakogi et al.

[11] Patent Number: 5,598,490
[45] Date of Patent: Jan. 28, 1997

[54] DIELECTRIC OPTICAL WAVEGUIDE DEVICE

[75] Inventors: Hironao Hakogi; Takashi Yamane, both of Kawasaki, Japan

[73] Assignee: Fujitsu Limited, Kawasaki, Japan

[21] Appl. No.: 459,459

[22] Filed: Jun. 2, 1995

Related U.S. Application Data

[62] Division of Ser. No. 190,478, Feb. 2, 1994, Pat. No. 5,473,711.

[30] Foreign Application Priority Data

Sep. 17, 1993 [JP] Japan ................................. 5-231496

[51] Int. Cl.[6] ........................................... G02B 6/12
[52] U.S. Cl. ............................................. 385/14; 385/131
[58] Field of Search ................................. 385/2, 3, 8, 9, 385/10, 40, 41, 131, 14, 132

[56] References Cited

U.S. PATENT DOCUMENTS

| | | | |
|---|---|---|---|
| 5,119,449 | 6/1992 | Komatsu et al. | 385/4 |
| 5,153,934 | 10/1992 | Okayama et al. | 385/8 |
| 5,189,713 | 2/1993 | Shaw | 385/2 |
| 5,214,724 | 5/1993 | Seino et al. | 385/2 |
| 5,285,514 | 2/1994 | Nojiri et al. | 385/2 |

FOREIGN PATENT DOCUMENTS

| | | |
|---|---|---|
| 0444959 | 9/1991 | European Pat. Off. . |
| 1210928 | 8/1989 | Japan . |
| 1302325 | 12/1989 | Japan . |

OTHER PUBLICATIONS

15th European Conference on Optical Communication, Sep. 1989, vol. 1, pp. 421–424.

*Primary Examiner*—John Ngo
*Attorney, Agent, or Firm*—Staas & Halsey

[57] ABSTRACT

An insulating buffer layer of $SiO_2$ is formed on a substrate of $LiNbO_3$ crystal in which optical waveguides are formed, and a semiconducting film of Si is formed on the buffer layer. An insulating diffusion suppressing layer of $SiO_2$ is formed on the semiconducting film, and a pair of electrodes of Au are located on the diffusion suppressing layer. The formation of silicide by solid-phase diffusion of the electrodes into the semiconducting film can be prevented by the diffusion suppressing layer.

7 Claims, 3 Drawing Sheets

DIELECTRIC OPTICAL WAVEGUIDE DEVICE

This application is a division of application Ser. No. 08/190,478, filed Feb. 2, 1994, now allowed (U.S. Pat. No. 5,473,711).

BACKGROUND OF THE INVENTION

1. Field of the Invention

The present invention relates generally to a dielectric optical waveguide device, and more particularly to an improved technique for providing a high reliability and long service life of such a dielectric optical waveguide device.

2. Description of the Related Art

An optical waveguide device is known as a kind of optical device such as optical modulator. The optical waveguide device has an advantage such that it can be easily reduced in size and weight from a viewpoint of structure and can be mass-produced by using a planar technique or the like. In particular, a ferroelectric optical waveguide device, which is constructed of a substrate formed of ferroelectric crystal, an optical waveguide formed in the substrate by thermal diffusion of metal or oxide thereof, and a pair of metal electrodes arranged on the substrate, can control a refractive index according to an applied voltage, so that the ferroelectric optical waveguide device is applied to various optical devices.

A conventional dielectric optical waveguide device is constructed, for example, of a substrate formed of ferroelectric crystal, an optical waveguide formed in a part of the surface of the substrate by thermal diffusion of metal or oxide thereof, an insulating buffer layer formed on the surface of the substrate in which the optical waveguide is formed, a semiconducting film formed on the buffer layer, and a pair of metal electrodes arranged in spaced relationship from each other on the semiconducting film.

The reason why the insulating buffer layer is formed on the substrate is to reduce light absorption to the electrodes, and the reason why the electrodes are located on the semiconducting film is to avoid electric charges generated by a pyroelectric effect due to a temperature change that will be concentrated under the electrodes. The semiconducting film is formed of silicon (Si) in view of manufacturability, stability, etc., and the electrodes are formed of gold (Au).

In the conventional dielectric optical waveguide device, however, a solid-phase alloying reaction occurs at a joined portion of the semiconducting film of silicon or the like to the electrodes of gold or the like. In the case where the solid-phase alloying reaction between silicon and gold occurs, gold silicide is formed. This reaction proceeds with the passage of time to cause a problem that the pair of electrodes are finally short-circuited. In particular, the higher the temperature, the faster the progress of the solid-phase alloying reaction, so that the above problem becomes more serious.

In general, the solid-phase alloying reaction is a chemical change occurring between a metal solid and another solid joined thereto, that is, a reaction wherein metal molecules or atoms of the metal solid are diffused into the solid joined thereto to thereby cause the progress of alloying. In general, the higher the temperature, the higher the rate of the progress.

SUMMARY OF THE INVENTION

It is therefore an object of the present invention to provide a dielectric optical waveguide device, which can suppress the generation of a short-circuit between the electrodes to thereby provide a high reliability and long life.

In accordance with a first aspect of the present invention, there is provided a dielectric optical waveguide device comprising a dielectric substrate in which optical waveguides are formed; an insulating buffer layer provided on said substrate; a semiconducting film provided on said buffer layer; a pair of metal electrodes arranged in spaced relationship from each other so as to correspond to said optical waveguides formed in said substrate; and an insulating diffusion suppressing layer provided so as to be interposed between said semiconducting film and said electrodes.

The diffusion suppressing layer may be uniformly formed on the semiconducting film so as to cover an area between the pair of electrodes. Alternatively, the diffusion suppressing layer may be formed as a pair of diffusion suppressing layers spaced from each other so as to completely correspond to the pair of electrodes.

The substrate may be formed of lithium niobate ($LiNbO_3$). The semiconducting film may be formed of silicon (Si). The electrodes may be formed of gold (Au). The buffer layer and the diffusion suppressing layer may be formed of silicon dioxide ($SiO_2$). Preferably, the thickness of the diffusion suppressing layer is set smaller than the thickness of the buffer layer.

In accordance with a second aspect of the present invention, there is provided a dielectric optical waveguide device comprising a dielectric substrate in which optical waveguides are formed; an insulating buffer layer provided on said substrate; a semiconducting film provided on said buffer layer; a pair of metal electrodes arranged in spaced relationship from each other so as to correspond to said optical waveguides formed in said substrate; and a pair of diffusion suppressing layers provided so as to be interposed between said semiconducting film and said electrodes and spaced from each other so as to completely correspond to said electrodes, said diffusion suppressing layers being formed of metal having a diffusion constant on a solid-phase alloying reaction with said semiconducting film smaller than a diffusion constant on a solid-phase alloying reaction between said electrodes and said semiconducting film.

The diffusion constant on the solid-phase alloying reaction means a value indicating a degree of diffusion of metal by a solid-phase reaction between the metal and a body joined thereto.

The substrate may be formed of lithium niobate ($LiNbO_3$). The semiconducting film may be formed of silicon (Si). The electrodes may be formed of gold (Au). The diffusion suppressing layers may be formed of one of aluminum (Al), titanium (Ti), chromium (Cr), nickel (Ni), copper (Cu), zinc (Zn), gallium (Ga), germanium (Ge), silver (Ag), indium (In), and platinum (Pt), or an alloy thereof.

In accordance with a third aspect of the present invention, there is provided a dielectric optical waveguide device comprising a dielectric substrate in which optical waveguides are formed; a pair of metal electrodes arranged in spaced relationship from each other so as to correspond to said optical waveguides formed in said substrate; a first layer provided between said substrate and said electrodes, said first layer having a first semiconducting portion formed in a portion corresponding to an area interposed between said pair of electrodes so as to extend along opposed portions of said electrodes over the length thereof, and a first insulating portion formed so as to surround said first semiconducting portion; and a second layer interposed between said first layer and said electrodes, said second layer having a second insulating portion formed so as to generally correspond to said first semiconducting portion, and a second semiconducting portion formed so as to surround said second insulating portion and be joined to a peripheral portion of said first semiconducting portion.

The substrate may be formed of lithium niobate (LiNbO$_3$). The first semiconducting portion of the first layer and the second semiconducting portion of the second layer may be formed of silicon (Si). The electrodes may be formed of gold (Au). The first semiconducting portion of the first layer may comprise a plurality of semiconducting portions spaced from each other, and the second insulating portion of the second layer may comprise a plurality of insulating portions spaced from each other.

According to the first aspect of the present invention, the insulating diffusion suppressing layer is interposed between the semiconducting film and the pair of electrodes to thereby suppress a solid-phase alloying reaction between the semiconducting film and the electrodes. Accordingly, the problem that the pair of electrodes are short-circuited through the semiconducting film with the passage of time can be reduced to thereby effect a high reliability and a long life of the dielectric optical waveguide device.

In the case where the semiconducting film is formed of silicon, it is rational to use silicon dioxide for the material of the diffusion suppressing layer, because in the manufacturing process the diffusion suppressing layer can be easily formed as a silicon dioxide film by forming the semiconducting film on the buffer layer and then heating to oxidize the surface of the semiconducting film.

While the larger the thickness of the diffusion suppressing layer, the more effective the suppression of the solid-phase alloying reaction, the thickness of the diffusion suppressing layer is preferably set smaller than at least the thickness of the buffer layer, because an excessive thickness of the diffusion suppressing layer incurs an increase in driving voltage to be applied to the electrodes.

According to the second aspect of the present invention, the diffusion suppressing layers formed of metal are interposed between the semiconducting film and the pair of electrodes to thereby suppress a solid-phase alloying reaction between the semiconducting film and the electrodes. Accordingly, the problem that the pair of electrodes are short-circuited through the semiconducting film with the passage of time can be reduced to thereby effect a high reliability and a long life of the dielectric optical waveguide device.

It is essential that the metal forming the diffusion suppressing layers has a diffusion constant on the solid-phase alloying reaction with the semiconducting film smaller than a diffusion constant on the solid-phase alloying reaction between the electrodes and the semiconducting film, and that the diffusion suppressing layers are electrically spaced from each other, because the short-circuit between the pair of electrodes must not be allowed.

According to the third aspect of the present invention, the second insulating portion is present in a portion of the second layer interposed between the pair of electrodes so as to extend along the opposed portions of the electrodes over the length thereof. Furthermore, the first semiconducting portion is present in the first layer so as to generally correspond to the second insulating portion. Therefore, the progress of a solid-phase alloying reaction between the electrodes and the second semiconducting portion is hindered by the second insulating portion, and the path of the progress of the solid-phase alloying reaction is complicated. Accordingly, a period of time until the pair of electrodes are short-circuited with the passage of time can be extended to thereby effect a high reliability and a long life of the dielectric optical waveguide device.

It is anticipated that the provision of the second insulating portion in the second layer will hinder the original object of the second layer such that a change (temperature drift) in characteristics due to the generation of ununiform electric charge distribution under the electrodes is to be suppressed. However, such a possibility is eliminated because the second insulating portion is compensated by the first semiconducting portion.

When the first semiconducting portion of the first layer comprises a plurality of semiconducting portions spaced from each other, and the second insulating portion of the second layer comprises a plurality of insulating portions spaced from each other, the path of the progress of the solid-phase alloying reaction can be further complicated to effect a high reliability and a long life of the dielectric optical waveguide device.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
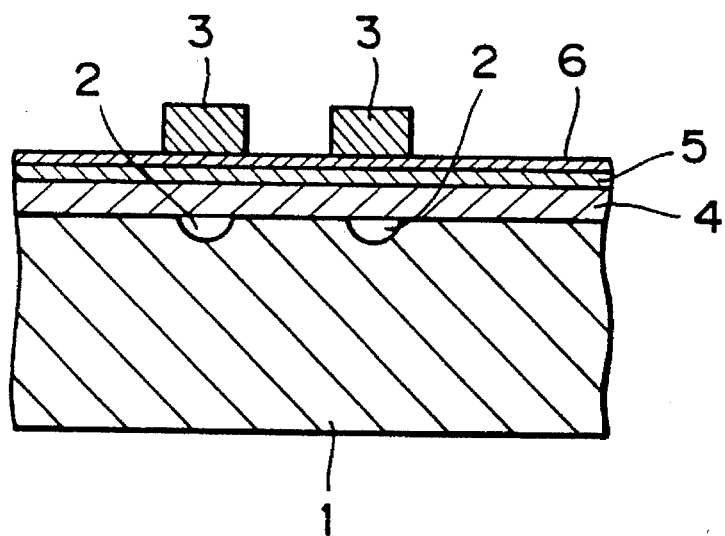
FIG. 1 is a sectional view of a first preferred embodiment of the present invention.
Figure 2:
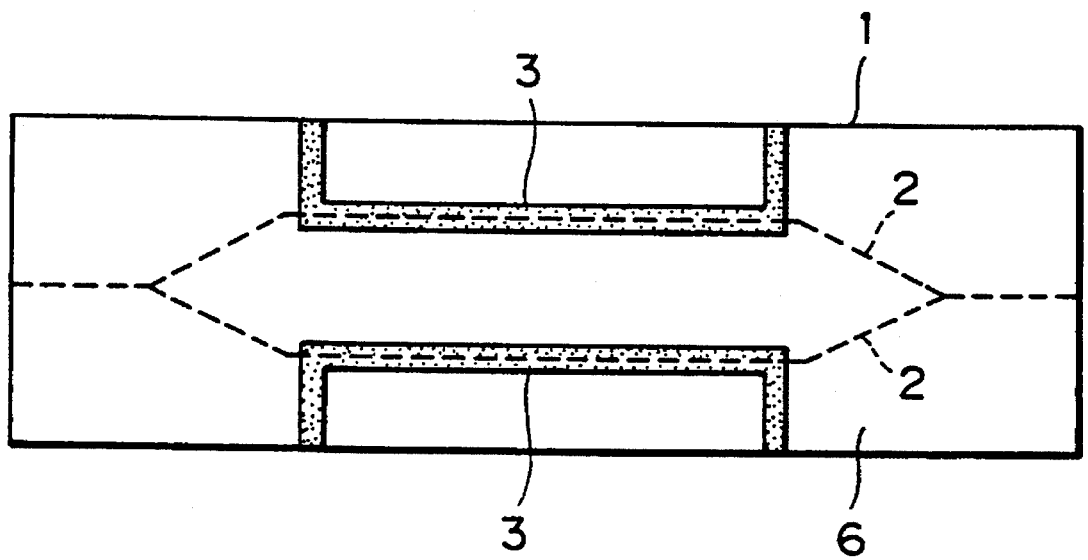
FIG. 2 is a plan view of the first preferred embodiment of the present invention.

There will now be described some preferred embodiments of the present invention with reference to the drawings. FIGS. 1 and 2 show a first preferred embodiment of the present invention. More specifically, FIGS. 1 and 2 are a sectional view and a plan view of an essential part of a Mach-Zehnder optical modulator, respectively.

Referring to FIGS. 1 and 2, reference numeral 1 denotes a substrate formed from a Z-cut crystalline plate of lithium niobate (LiNbO$_3$). A pair of optical waveguides 2 are formed in an upper surface of the substrate 1. The pair of optical waveguides 2 are connected together in the vicinity of both ends thereof. The optical waveguides 2 are formed by thermally diffusing metal such as titanium (Ti) in the upper surface of the substrate 1 to thereby increase a refractive index at a portion where the metal is thermally diffused.

Reference numerals 3 denote a pair of electrodes formed of gold (Au). The pair of electrodes 3 are provided so as to correspond to the pair of optical waveguides 2, respectively.

One of the electrodes 3 is a traveling wave control electrode, and the other is a ground electrode. A buffer layer 4 formed of silicon dioxide ($SiO_2$) is uniformly formed on the upper surface of the substrate 1 in which the optical waveguides 2 are formed. The buffer layer 4 serves to reduce light absorption to the electrodes 3 correspondingly located over the optical waveguides 2.

A high-resistance semiconducting film 5 formed of silicon (Si) is uniformly formed on the buffer layer 4. The lithium niobate crystal constituting the substrate 1 has a large pyroelectric effect, so that electric charges are generated on the upper surface of the substrate 1 by a temperature change of the substrate 1, and the electric charges are concentrated under the electrodes 3 to influence a refractive index of the optical waveguides 2. In the case of an optical modulator, the influence on the refractive index of the optical waveguides 2 causes a change (temperature drift) of an operating point to result in unstable operation. The semiconducting film 5 serves to prevent such a temperature drift.

Furthermore, an insulating film 6 as a diffusion suppressing layer formed of silicon dioxide ($SiO_2$) is uniformly formed on the semiconducting film 5. The insulating film 6 can be easily formed by first forming the semiconducting film 5 having a thickness larger than a required thickness and then heating to oxidize the surface of the semiconducting film 5, for example. Further, it is preferable to set the thickness of the insulating film 6 smaller than the thickness of the buffer layer 4 in order to prevent an increase in driving voltage to be applied to the electrodes 3 due to an insulating property of the insulating film 6. The electrodes 3 are formed on the insulating film 6 by vapor deposition, plating, etc.

The principle of operation of this optical modulator will now be described in brief. Incident light from a connected end of the pair of optical waveguides 2 is divided into two parts, which are in turn introduced into the pair of optical waveguides 2. When a driving voltage is applied to the electrodes 3, a phase difference is generated between the two lights by an electrooptic effect. Then, the two lights are coupled again to obtain an optical signal output. When the driving voltage is applied so that the phase difference between the two lights becomes zero or π, for example, an ON-OFF pulse signal can be obtained.

According to this preferred embodiment, the insulating film 6 is interposed between the semiconducting film 5 and the pair of electrodes 3. That is, the electrodes 3 are not directly joined to the semiconducting film 5. Therefore, a solid-phase alloying reaction between the electrodes 3 and the semiconducting film 5 can be suppressed. Accordingly, the problem that the pair of electrodes 3 are short-circuited with the passage of time can be reduced to thereby obtain an optical modulator having a high reliability and a long service life.

Figure 3:
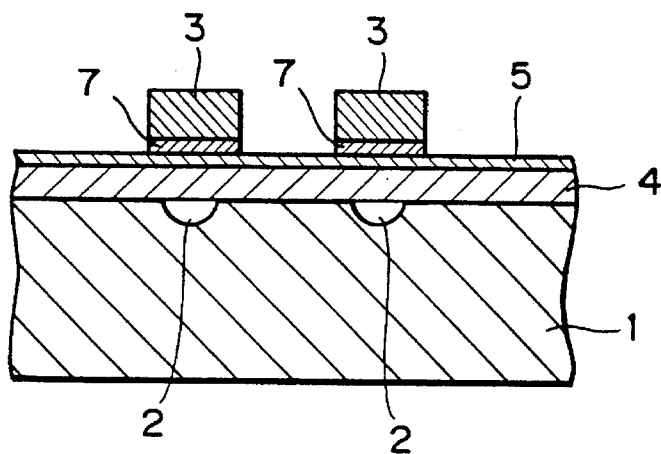
FIG. 3 is a sectional view of a second preferred embodiment of the present invention.

FIG. 3 shows a second preferred embodiment of the present invention. More specifically, FIG. 3 is a sectional view of an essential part of a Mach-Zehnder optical modulator. The same parts as those of the first preferred embodiment are denoted by the same reference numerals, and only different parts will be described.

In the first preferred embodiment described above, the insulating film 6 as a diffusion suppressing layer is interposed between the semiconducting film 5 and the pair of electrodes 3, whereas in the second preferred embodiment a pair of metal films 7 as diffusion suppressing layers are interposed between the semiconducting film 5 and the pair of electrodes 3. The pair of metal films 7 are provided so as to correspond to the pair of electrodes 3 and be electrically spaced from each other.

The metal films 7 are formed of a material such as chromium (Cr) which has a diffusion constant on the solid-phase alloying reaction with the semiconducting film 5 (Si) smaller than a diffusion constant on the solid-phase alloying reaction between the electrodes 3 (Au) and the semiconducting film 5 (Si). Other examples of the material forming the metal films 7 may include aluminum (Al), titanium (Ti), nickel (Ni), copper (Cu), zinc (Zn), gallium (Ga), germanium (Ge), silver (Ag), indium (In), platinum (Pt), and an alloy thereof.

According to this preferred embodiment, the metal films 7 are interposed between the semiconducting film 5 and the pair of electrodes 3, and the diffusion constant on the solid-phase alloying reaction between the metal films 7 and the semiconducting film 5 is smaller than the diffusion constant on the solid-phase alloying reaction between the electrodes 3 and the semiconducting film 5. Therefore, the progress of the solid-phase alloying reaction of the semiconducting film 5 can be reduced as compared with that in the prior art structure. Accordingly, the problem that the pair of electrodes 3 are short-circuited with the passage of time can be reduced to thereby obtain an optical modulator having high reliability and long service life.

Figure 4:
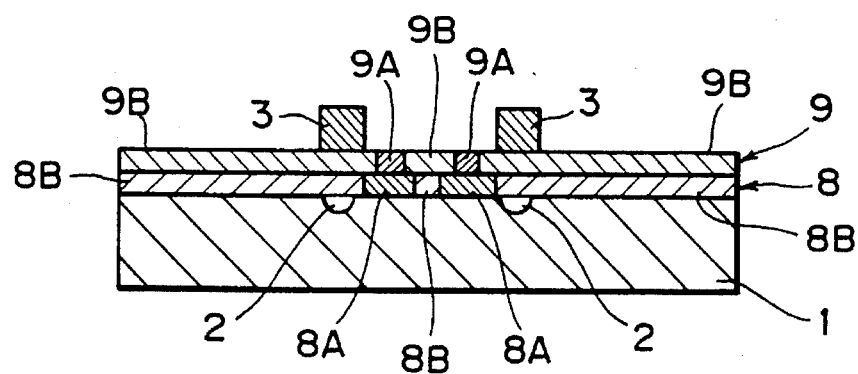
FIG. 4 is a sectional view of a third preferred embodiment of the present invention.
Figure 5:
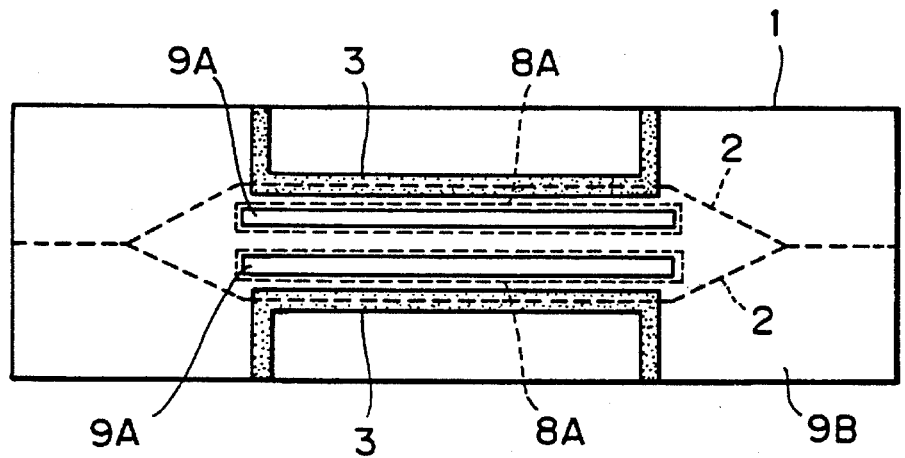
FIG. 5 is a plan view of the third preferred embodiment of the present invention.

FIGS. 4, 5 and 6A–6F show a third preferred embodiment of the present invention. More specifically, FIGS. 4 and 5 are a sectional view and a plan view of an essential part of a Mach-Zehnder optical modulator, respectively, and FIGS. 6A–6F are sectional views illustrating a manufacturing process for the optical modulator. The same parts as those of the first preferred embodiment or the second preferred embodiment are denoted by the same reference numerals. Referring first to FIGS. 4 and 5, reference numeral 1 denotes a substrate formed from a crystalline plate of lithium niobate ($LiNbO_3$). A pair of optical waveguides 2 are formed in an upper surface of the substrate 1. The pair of optical waveguides 2 are connected together in the vicinity of both ends thereof.

Reference numerals 3 denote a pair of electrodes formed of gold (Au). The pair of electrodes 3 are provided so as to correspond to the pair of optical waveguides 2, respectively. One of the electrodes 3 is a traveling wave control electrode, and the other is a ground electrode. A first layer 8 functioning as a buffer layer formed primarily of silicon dioxide ($SiO_2$) is uniformly formed on the upper surface of the substrate 1 in which the optical waveguides 2 are formed. The first layer 8 serves to reduce light absorption to the electrodes 3 correspondingly located over the optical waveguides 2.

The first layer 8 is composed of a pair of semiconducting portions (first semiconducting portion) 8A formed of silicon (Si) and an insulating portion (first insulating portion) 8B formed of silicon dioxide ($SiO_2$). The pair of semiconducting portions 8A are formed in a portion of the first layer 8 corresponding to an area interposed between the pair of electrodes 3 so as to extend along opposed portions of the electrodes 3 over the length thereof (see FIG. 5). The insulating portion 8B is formed as the remaining portion of the first layer 8.

A second layer 9 as a high-resistance semiconducting film formed primarily of silicon (Si) is uniformly formed on the first layer 8. The second layer 9 is composed of a pair of insulating portions (second insulating portion) 9A formed of silicon dioxide ($SiO_2$) and a semiconducting portion (second semiconducting portion) 9B formed of silicon (Si). The pair of insulating portions 9A are formed in a portion of the second layer 9 so as to correspond to the pair of semiconducting portions 8A of the first layer 8, respectively. The semiconducting portion 9B is formed as the remaining portion of the second layer 9.

Each insulating portion 9A is slightly smaller in size than the corresponding semiconducting portion 8A, and a peripheral portion of each semiconducting portion 8A of the first layer 8 is joined to the semiconducting portion 9B of the second layer 9. That is, each insulating portion 9A of the second layer 9 is compensated by the corresponding semiconducting portion 8A of the first layer 8, and the semiconducting portion 9B and the semiconducting portions 8A have a function corresponding to that of the semiconducting film 5 in the first preferred embodiment or the second preferred embodiment.

The Z-cut lithium niobate crystal constituting the substrate 1 has a large pyroelectric effect, so that electric charges are generated on the upper surface of the substrate 1 by a temperature change of the substrate 1, and the electric charges are concentrated under the electrodes 3 to influence a refractive index of the optical waveguides 2. In the case of an optical modulator, the influence on the refractive index of the optical waveguides 2 causes a change (temperature drift) of an operating point to result in unstable operation. The semiconducting portion 9B of the second layer 9 and the semiconducting portions 8A of the first layer 8 serve to prevent such a change of the operating point due to the temperature change. The electrodes 3 are provided on the semiconducting portion 9B of the second layer 9.

An example of a manufacturing process of the optical modulator shown in FIGS. 4 and 5 will now be described in brief with reference to FIGS. 6A to 6F.

Figure 6A:
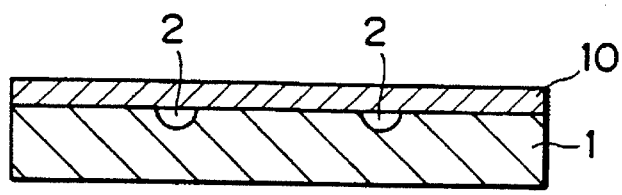
FIGS. 6A–6F are sectional views illustrating a manufacturing process for the third preferred embodiment of the present invention.
Figure 6B:
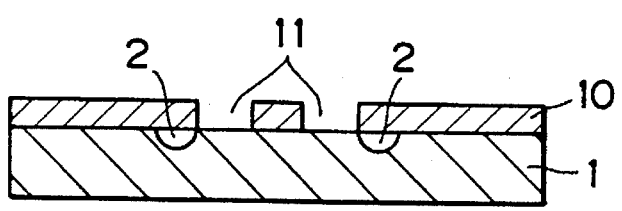
Figure 6C:
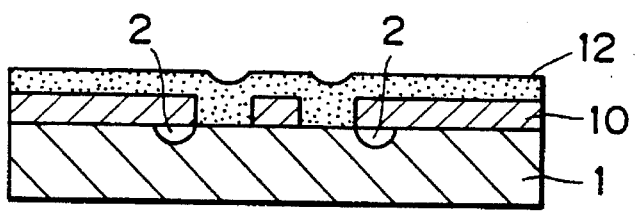

As shown in FIG. 6A, the optical waveguides 2 are formed in the upper surface of the substrate 1 formed from a crystalline plate of lithium niobate ($LiNbO_3$) by thermally diffusing metal such as titanium (Ti) to thereby increase a refractive index at a portion where the metal is thermally diffused. Then, a silicon dioxide ($SiO_2$) film 10 is uniformly formed on the whole upper surface of the substrate 1. Then, as shown in FIG. 6B, a pair of grooves 11 are formed by partially etching off a portion of the silicon dioxide film 10 corresponding to an area interposed between the pair of electrodes 3 to be formed later. Then, as shown in FIG. 6C, a silicon (Si) film 12 is formed on the silicon dioxide film 10 so as to fill the grooves 11.

Figure 6D:
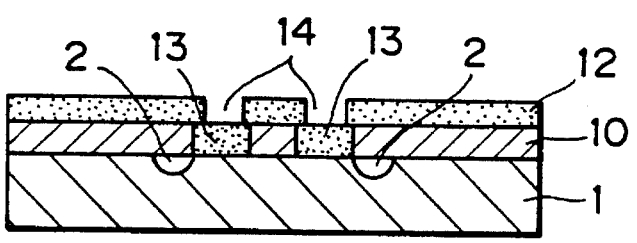
Figure 6E:
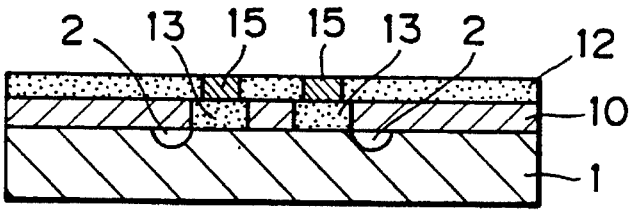
Figure 6F:
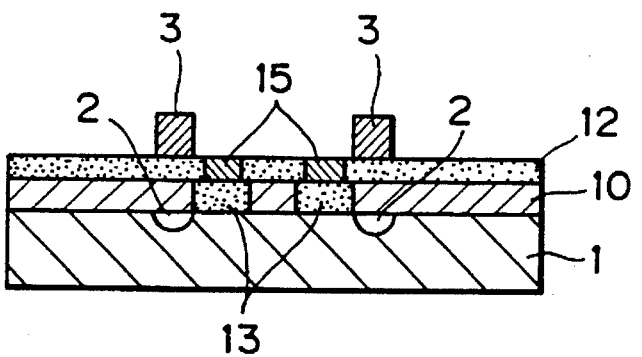

Then, as shown in FIG. 6D, a pair of grooves 14 are formed by partially etching off the silicon film 12 (but leaving a pair of silicon films 13 formed in the grooves 11). Then, as shown in FIG. 6E, a pair of silicon dioxide films 15 are formed so as to fill the grooves 14. Then, as shown in FIG. 6F, the electrodes 3 are formed on the silicon film 12 by vapor deposition or plating of gold.

According to the third preferred embodiment, the pair of insulating portions 9A are formed in a portion of the second layer 9 interposed between the pair of electrodes 3, and the pair of semiconducting portions 8A are formed in the first layer 8 so as to generally correspond to the pair of insulating portions 9A, respectively. Accordingly, as apparent from FIG. 4, the semiconducting portions 9B and 8A present in the area between the pair of electrodes 3 are stepped to form a complicated path. Accordingly, even when the formation of silicide from the semiconducting portions 9B and 8A proceeds, a long time is required until the pair of electrodes 3 are short-circuited. Accordingly, a high reliability and a long service life of the optical modulator can be effected.

Further, it is anticipated that the provision of the insulating portions 9A in the second layer 9 will hinder the original function of the second layer 9 such that a change (temperature drift) in characteristics due to the generation of ununiform electric charge distribution under the electrodes 3 is suppressed. However, such a possibility is eliminated because the insulating portions 9A of the second layer 9 are compensated by the semiconducting portions 8A of the first layer 8.

Although the two semiconducting portions 8A and the two insulating portions 9A are formed in the first layer 8 and the second layer 9, respectively, in this preferred embodiment, the number of the semiconducting portions 8A and the insulating portions 9A is not limited in the present invention. For example, a single semiconducting portion 8A and a single insulating portion 9A may be formed, or three or more semiconducting portions 8A and three or more insulating portions 9A may be formed.

According to the present invention as constructed above, the short-circuit between the electrodes due to a solid-phase alloying reaction can be suppressed to thereby provide a high reliability and long service life of a dielectric optical waveguide device.

What is claimed is:

1. A dielectric optical waveguide device comprising:

a dielectric substrate;

a pair of optical waveguides formed in said substrate;

an insulating buffer layer provided on said substrate;

a semiconductor film provided on said buffer layer;

a pair of metal electrodes arranged in spaced relationship from each other so as to correspond to said optical waveguides formed in said substrate; and a diffusion suppressing layer provided so as to be interposed between said semiconductor film and said electrodes, said diffusion suppressing layer being formed of insulating material having a diffusion constant on a solid-phase alloying reaction with said electrodes smaller than a diffusion constant on a solid-phase alloying reaction between said electrodes and said semiconductor film.

2. A dielectric optical waveguide device according to claim 1, wherein said substrate is formed of lithium niobate ($LiNbO_3$).

3. A dielectric optical waveguide device according to claim 1, wherein said semiconducting film is formed of silicon (Si), and said electrodes are formed of gold (Au).

4. A dielectric optical waveguide device according to claim 3, wherein said diffusion suppressing layer is formed of silicon dioxide ($SiO_2$).

5. A dielectric optical waveguide device according to claim 4, wherein said buffer layer is formed of silicon dioxide ($SiO_2$).

6. A dielectric optical waveguide device according to claim 5, wherein a thickness of said diffusion suppressing layer is smaller than a thickness of said buffer layer.

7. A dielectric optical waveguide device comprising:

a dielectric substrate;

an optical waveguide formed in said substrate;

an insulating buffer layer provided on said substrate;

a semiconductor film provided on said buffer layer;

an electrode disposed adjacent to said optical waveguide, said electrode applying an electric field to light propagating through said optical waveguide; and a diffusion suppressing layer provided between said semiconductor film and said electrode, said diffusion suppressing layer having a diffusion constant on a solid-phase alloying reaction with said electrode smaller than a diffusion constant on a solid-phase alloying reaction between said electrode and said semiconductor film.

* * * * *